(12) United States Patent
Näsholm et al.

(10) Patent No.: US 7,892,313 B2
(45) Date of Patent: *Feb. 22, 2011

(54) NITROGEN CONTAINING FERTILIZER FOR PLANT GROWTH

(75) Inventors: Lars Torgny Näsholm, Holmsund (SE); Jonas Erik Gustav Öhlund, Umeå (SE)

(73) Assignee: SweTree Technologies AB, Umea (SE)

( * ) Notice: Subject to any disclaimer, the term of this patent is extended or adjusted under 35 U.S.C. 154(b) by 358 days.

This patent is subject to a terminal disclaimer.

(21) Appl. No.: 12/108,489

(22) Filed: Apr. 23, 2008

(65) Prior Publication Data

US 2009/0056397 A1    Mar. 5, 2009

Related U.S. Application Data

(63) Continuation of application No. 10/276,494, filed as application No. PCT/SE01/01059 on May 14, 2001, now Pat. No. 7,381,237.

(30) Foreign Application Priority Data

May 15, 2000    (SE) ..................... 0001767

(51) Int. Cl.
*C01C 1/18* (2006.01)
(52) U.S. Cl. .................. 71/54; 71/56; 71/61
(58) Field of Classification Search ........ 71/54, 71/56, 61
See application file for complete search history.

(56) References Cited

U.S. PATENT DOCUMENTS

| | | | | |
|---|---|---|---|---|
| 5,174,805 A | * | 12/1992 | Masuda | 71/29 |
| 5,604,125 A | | 2/1997 | Teasdale et al. | |
| 6,074,452 A | * | 6/2000 | Rogmann | 71/27 |
| 6,241,795 B1 | * | 6/2001 | Svec et al. | 71/11 |

FOREIGN PATENT DOCUMENTS

| | | | |
|---|---|---|---|
| CN | 1152565 | * | 6/1997 |
| EP | 0562898 | A2 | 9/1993 |
| JP | 7087844 | * | 4/1995 |
| JP | 7087844 | A | 4/1995 |
| RU | 2016510 | C1 | 7/1994 |
| SU | 1007610 | * | 3/1983 |
| SU | 1007610 | A1 | 3/1983 |
| SU | 1510781 | * | 9/1989 |
| SU | 1510781 | A1 | 9/1989 |
| WO | WO-92/07460 | A1 | 5/1992 |

OTHER PUBLICATIONS

Bettelheim et al. "Introduction to General, Organic & Biochemistry", Publishers: Saunders College Publishing, New York, pp. 498-499, 1984.*
"L-Arginine", Physicians Desk Reference, 2004, downloaded from (http://www.pdrhealth.com/drug_info/nmdrugprofiles/nutsupdrugs/lar_0024.shtml).*
Valle et al., Acta Agral. Fennica, vol. 107, pp. 308-319, 1965.*
Amino Acids fact Sheets, http://www.dspace.dial.pipex.com/town/place/vu87/amino.shtml, 2001.*
"Amino Acids fact Sheets" (2001), www.dspace.dial.pipex.com/town/place/vu87/amino.shtml.
"L-Arginine" (2004), Physicians Desk Reference, www.pdrhealth.com/drug.sub.info/nmdrugprofiles/nutsupdrugs/lar.- sub.—0024.shtml.
Bettelheim at al. (1984). Introduction to General, Organic & Biochemistry. Saunders College Publishing, New York, pp. 498-499.
STN International, File CA, Accession No. 131:336363 (Zhengzhou Univ., Peop. Rep. China) CN 1152565 A, publ. Jun. 25, 1997.
Valle at al. (1965). Acta Agral. Fennica 107:308-319.

* cited by examiner

*Primary Examiner*—C. Sayala
(74) *Attorney, Agent, or Firm*—Morrison & Foerster LLP

(57) ABSTRACT

The present invention relates to a nitrogen containing fertilizer for plant growth and intended to be administered to growth substrate either alone or in mixture with other fertilizers. The invention is characterized in that the fertilizer is comprised of the L-form of a basic protein amino acid or its salt.

7 Claims, 2 Drawing Sheets

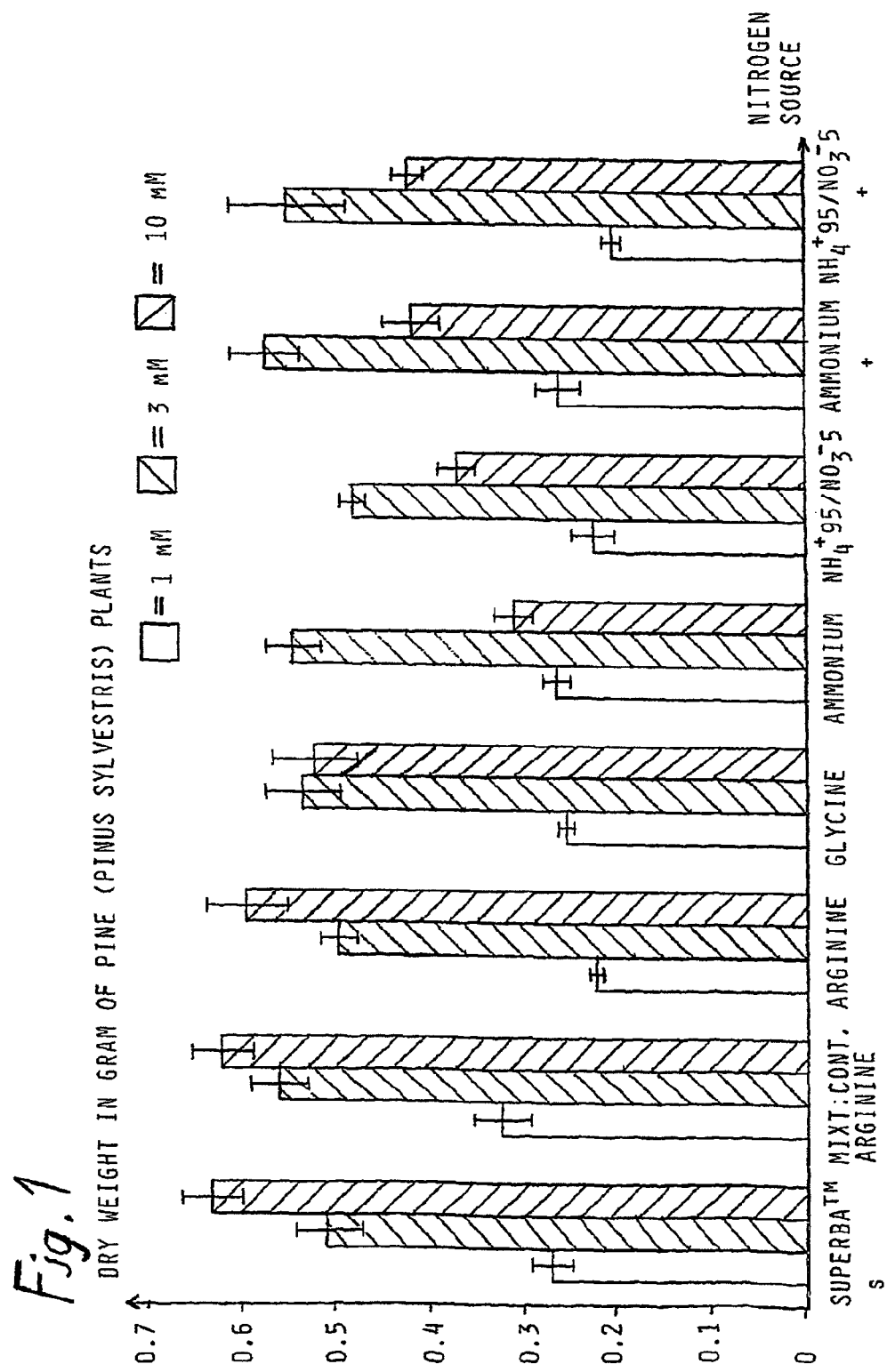

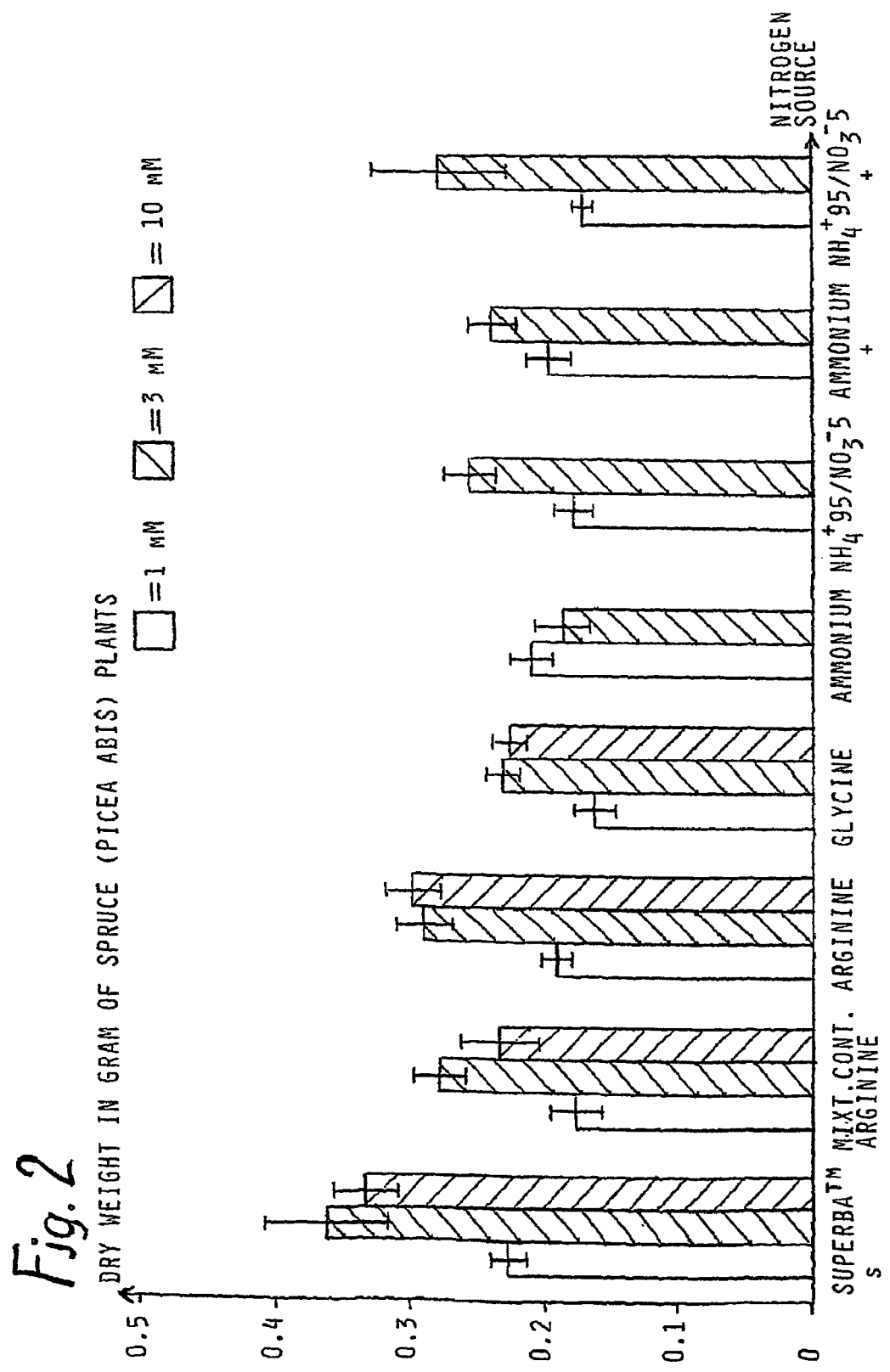

NITROGEN CONTAINING FERTILIZER FOR PLANT GROWTH

CROSS REFERENCE TO RELATED APPLICATIONS

This is a continuation of U.S. application Ser. No. 10/276,494, which is a 371 of PCT International Application No. PCT/SEOI/01059 filed on May 14, 2001, which application is incorporated herein by reference in its entirety.

TECHNICAL FIELD

The present invention relates to a nitrogen containing fertilizer for plant growth intended for application to a growth substrate, either alone or in mixture with other fertilizers. The fertilizer concerned can be used very effectively in raising (tree) seedlings from the seeds of various tree species, including both hardwoods and softwoods, said seedlings being planted out in a growth site, for instance in woodland, at a later stage. As the fertilizer can be used to raise (tree) seedlings from (tree) seeds, it will be evident that the fertilizer can also be used generally in raising and cultivating plants from seed, including flowering plants. The fertilizer concerned can also be used for cultivating the planted plant to maturity. By growth substrate is meant all known growth substrates including different types of soil, peat, humus, mineral soil, sand, etc.

BACKGROUND ART

Coniferous seedlings, for example, are raised from the seed of conifers, for example, in nurseries, in a greenhouse and/or an open land outdoors. Indoor cultivation normally involves the use of a very large number of small containers or pots that contain a growth substrate, for instance peat, in which one or more seeds are initially implemented. One pot is normally used for raising one (tree) seedling. When the seedling has reached a certain size, it is normally moved to an outdoor location for a certain amount of time, so as to acclimatise the seedling approximately to the climate that will prevail at the future growth site of the seedling, or sapling, subsequent to being planted in a forest area, for instance. Normally, a large number of pots (tens-hundreds) are joined together to form a cassette.

A large number of cassettes are placed in, e.g., rectangular forcing benches or frames that have four low walls and a generally open bottom, for instance comprising a number of mutually spaced bars or struts. These forcing benches or frames rest, e.g., on the short sides of a support with the bottoms of the benches or frames spaced, for instance, from ten to fifteen centimeters above the greenhouse floor, meaning that air will circulate around all pots, including the bottoms of the pots. It is endeavoured to cover the largest possible area of the floor surface in the greenhouse with these forcing benches or frames. These forcing benches or frames are movable and can be shifted from the greenhouse to an ambient outdoor area with the aid of a truck for instance. It is important to note that greenhouses are typically placed directly on the ground. Normally, nurseries, for example, are erected in places where the ground naturally consists of sand and/or gravel. Such grounds are often relatively flat by nature, and any litter present can be easily removed, and the ground smoothed out when necessary to form a generally even and horizontal greenhouse floor.

In order that the seed in each pot will produce a seedling and, above all, to ensure that the seedling will be given the chance to grow to a size in which it can be planted outside, for instance in forest land, it is necessary to add externally fertilizer to the growth substrate in the pot, for instance the peat, at given intervals. It has long been usual to use a certain nutrient mixture that contains both macro nutrients and micro nutrients. Necessary macro nutrients are nitrogen (N), calcium (Ca), phosphor (P), sulphur (S), potassium (K) and magnesium (Mg). Necessary micro nutrients are iron (Fe), manganese (Mn), copper (Cu) molybdenum (Mo), boron (B), zinc (Zn), chlorine (Cl) and nickel (Ni). Calcium is normally added separately to the growth substrate in the form of lime. There are chemical suppliers who in an industrial way produce fertilizers containing the other above mentioned nutrients. These fertilizers are not produced by mixing together the elements as such, but by mixing together a number of chemicals, normally salts, in which the elements are present. As the name implies, the macro nutrients are present in the mixture in a much higher proportion than the micro nutrients. Furthermore, the quantities between respective macro nutrients and between respective micro nutrients also differ, as does also the percentages. The aforesaid nutrient mixture or fertilizer can be purchased commercially in the form of a relatively concentrated aqueous solution.

This aqueous solution is purchased by nurseries and diluted with water to a suitable concentration of the chemicals concerned in aqueous solution, prior to use. Greenhouses are normally equipped with a sprinkler system through which the nutrient mixture in question is delivered to each clump of growth substrate in each pot. The sprinkler system includes, for example, a transversal pipe whose length is slightly greater than the combined width of the forcing benches or frames in a lateral row. One end of the pipe is connected to a flexible hose whose length corresponds generally to the length of the greenhouse. The opposite end of the pipe is plugged and nozzles are disposed at regular intervals along the pipe. The pipe and the hose attached thereto extend in two rails which extend longitudinally along the greenhouse and which are mounted in the roof structure of the greenhouse for instance. The arrangement concerned, including the pipe and the hose, is driven mechanically from one short side of the greenhouse to the other short side thereof, and back again. The hose connects the pipe to which it is fitted to a vessel that contains the nutrient mixture or the fertilizer in the form of said aqueous solution, which is pumped into the pipe and exits therefrom through the nozzles so as to be sprayed evenly over all plants/seeds in their individual clumps of growth substrate in respective pots, as the arrangement is advanced at a uniform speed over all forcing benches or frames and their respective cassettes. The described supply of nutrients to the plants, via the clumps of growth substrate takes place at most once a day, and is today often fully automated and fully computer controlled.

The macro nutrient nitrogen is of particular interest in the present context. According to the techniques known up to now, nitrogen in nitrate ($NO_3^-$) form and nitrogen in ammonium form ($NH_4^+$) has been used and traditionally, a mixture of these two nitrogen sources has been used. A concentration of 61.5% nitrate and 38.5% ammonium has long been considered a decisive blessing in respect to the optimum growth of conifer plants for instance. In the Swedish Patent Specification 323 255 (with patent of addition 331 610) Torsten Ingestad et al present a method of stimulating the growth of green plants by adding a mineral nutrient. The specialty with the method was (and is) that the mineral nutrient in a steady state shall be held in a form that can be taken up by the plants as a salt mixture, in which the element proportions correspond essentially to the proportions present in the plant at optimum growth. The elements present in the fertilizer are in accord with earlier calculated macro nutrients. According to the patent, a decisive feature is that the salt mixture includes a relatively large proportion of nitrogen in respect to other given macro nutrients, although to varying degrees. The fact that the nitrogen is present in a large quantity relative to phosphorus is of particular importance. The majority of the micro nutrients recited earlier are also included in the patent in question and are mentioned as trace substances. According to the exemplifying embodiments recited in the patent specification, both ammonium and nitrate are used as a nitrogen source, i.e. a mixture of those compounds. However, the question of a nitrogen source is not taken up explicitly and no mention is made of the distribution of precisely 61.5% nitrate and 38.5% ammonium. This determination must have been made in some other context or by some one else. Although the distribution of 38.6% and 61.4% is mentioned on page 9 of the Swedish Patent Specification, the distribution is not concerned with a distribution between nitrogen in ammonium form and nitrogen in a nitrate form, but with distribution of a trace substance mixture in accordance with what has been earlier described, plus a complex former EDTA, to the solution A and to the solution B in example 2.

Measurements carried out in nurseries concerned with raising conifer plants in which the aforesaid traditional nutrient mixture has been used as a fertilizer, have shown that only 30 to 40% of the nitrogen supplied is taken up by the seedlings (plants), whereas the remainder, i.e. 70-60%, goes to waste. The nitrogen disappears in several ways. A minor part of the nitrogen supplied never reaches its target, i.e. the clumps of growth substrate or root balls, but lands directly on the greenhouse floor, i.e. on the ground. One reason for this is that although strenuous efforts are made to ensure that the forcing benches or the frames are placed flush against one another, narrow cracks will always occur there between, and also as a result of the need to provide a number of narrow inspection corridors in the greenhouse. Moreover, because the aqueous solution containing the nutrients is sprayed or showered over the width of the greenhouse, or more accurately over the full width formed by a lateral row of forcing benches or frames, it is unavoidable that some of the aqueous solution (albeit only a small part) will land directly on the floor and directly enter the ground. A significant part of the nitrogen loss is due to some of the aqueous solution draining through the clump of growth substrate, for instance of peat, and out through the round holes or long strip slits present in the pots and therewith drop down onto the floor, i.e. the ground. The form in which the nitrogen is administered is significant in this respect. It has been found that the ammonium ion $NH_4^+$ is absorbed by the growth substrate to a much higher degree and remains in the substrate to a greater extent than in the case of the nitrate ion $NO_3^-$ which has a high degree of mobility, wherewith the major part of the ion passes straight through the growth substrate without fastening thereto. (The same thing occurs when fertilizing with ammonium nitrogen and nitrate nitrogen in woodlands in order for the trees to benefit from the nitrogen). It is not known whether a small part of the nitrogen in the sprayed nutrient solution is converted to ammonia and leaves the supply site via the air. Since systems similar to those used to fertilise plants indoors are also used to raise plants outdoors, corresponding leakage problems to the ground soil also occur with outdoor planting. In this context, another drawback with outdoor planting is that leaching of primarily the nitrate nitrogen, but also the ammonium nitrogen, is aggravated by the sometimes occurring rain.

The above described spillage or leakage of nitrogen constitutes problems. One problem resides in that an unnecessarily large amount of fertilizer is applied, which is uneconomical. Another and more serious problem is that the leaking nitrogen contaminates the ground and, as earlier mentioned, the nitrate ion in particular has a large tendency to penetrate through soil masses and ultimately reach the ground water, which is most undesirable.

It is proposed in the literature that with regard to concentration, the ammonium ion shall be preferred to the nitrate ion in the fertilizer. According to certain experts, this preference shall go as far as excluding the nitrate ion completely so that the ammonium ion will become the sole nitrogen source for the plants. Several persons skilled in this art are conscious of the problem associated with the nitrate ion, as described above.

Also found in the literature are proposals regarding quantitative differences between different macro nutrients that deviate from the traditional view of the experts. Also found in the literature is a single proposal of using an organic nitrogen source either in or as a fertilizer.

Earlier proposals for the use of the ammonium ion as a nitrogen source, either substantially or completely, is a step in the right direction from the aspect of leakage, and therewith also from an environmental aspect, since the ammonium ion is relatively immobile in growth substrates and consequently the major part of the nitrogen applied in ammonium form will remain in the growth substrate and gradually be taken up by the plant.

DISCLOSURE OF THE INVENTION

Technical Problems

It is clear from the earlier statements that when cultivating and raising plants there is required a source of nitrogen which whilst providing the nutrition needed for plant growth also has the maximum immobility in the growth substrate, such that substantially all of the nitrogen applied will remain in the growth substrate for future absorption by the plant.

The Solution

The problem is solved and the requirement satisfied by the present invention, which relates to a nitrogen-containing fertilizer for plant growth which is applied to growth substrate either alone or in mixture with other fertilizers, characterised in that the fertilizer is comprised of the L-form of a basic protein amino acid or its salt.

There are three known basic protein amino acids, these being arginine, lysine and histidine.

Arginine is colourless in a solid state and has the following structural formula

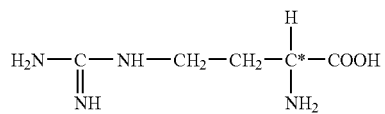

When the acid in solid form is dissolved in water or in an aqueous solution having a pH-value of 5-6 for example, which is a typical pH-level in nutrient solutions, the hydrogen ion is shifted from the carboxyl group COOH to the $NH_2$-group which is bound to the asymmetric carbon atom (designated C*) so as to form the group

An NH-group present at the opposite end of the molecule takes up a hydrogen ion from the aqueous solution, so as to form an

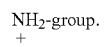

It is this ability of said acid, and also of the other two acids mentioned above, that explains the name basic protein amino acid. A definition of a base or a basic substance is, after all, that the substance is able to take up and bind hydrogen ions $H^+$.

Arginine thus has the following structural formula in said aqueous solution, for example.

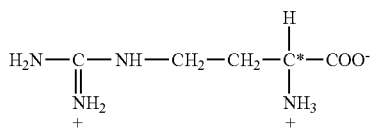

As seen, the compound as such includes two positive charges and one negative charge.

Analogously, lysine in aqueous solution having a pH-value of, e.g., 5-6 has the following structural formula

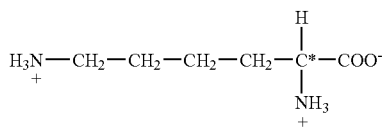

Histidine in aqueous solution having a pH-value of, e.g., 5-6 has the following structural formula.

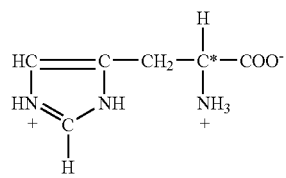

The formulae of the salts of these acids in an aqueous solution having a pH of, e.g., 5-6 is identical with the formulae of respective acids. In the case of salts, the proton in the carboxyl group of the acid is changed for a metal ion, for instance sodium. When the salt is dissolved in water or in an aqueous solution, the sodium ion is released and a proton or an hydrogen ion is taken up and rearranged in the afore-described manner and converts the $NH_2$-group, which is bound to the asymmetric carbon atom, to an

A proton or hydrogen ion is also taken up at the other end of the molecule, in the before described manner.

As seen, all of these acids and salts include an asymmetric carbon atom (designated C*). This means that these substances are optically active. When in a dissolved or molten state, such chemical compounds have the ability to rotate the polarisation plane of a plane-polarised light beam transmitted through a sample of the chemical compound. These acids may be found in two forms building isomers whose structural formulae are identical. However, these formulae are not identical when it is seen how certain groups are positioned in relation to each other in space. One form of the acid rotates the polarisation plane to the right and is therefore said to be the right hand form of the acid. This form is typically designated the D-form. The other form of the acid rotates the polarisation plane to the left, and is therefore said to be the left hand form of the acid. This form is typically designated the L-form.

It is the L-form of the above presented acids and their salts that functions very effectively as a nitrogen source for plants.

The fertilizer in question is applied to the plants and acts beneficially via any known growth substrate whatsoever, in accordance with the aforesaid. Nurseries, for instance, often use peat as a growth substrate. The calcium required for growth and raising a plant is often admixed with the peat in the form of lime, for instance powdered lime. It is fully possible to supply the growth substrate, for instance the peat, with the inventive fertilizer in the same way, i.e. in powder form. The fertilizer can either be applied together with the lime, or separately. When the fertilizer is applied in powder form, it is important to ensure that the fertilizer is uniformly distributed throughout the growth substrate, i.e. each cubic centimeter of the substrate shall preferably contain the same amount of the fertilizer. When water or an aqueous solution of supplementary nutrients is later applied to the growth substrate, the fertilizer will dissolve and build the form described above.

Alternatively, the fertilizer may be applied to the growth substrate in the form of an aqueous solution. It is unnecessary to add anything further to the water, wherewith the pH of the aqueous solution will be that imparted to said solution by the fertilizer itself. It is fully possible to add a pH-adjusting chemical (acid) so that the pH of the aqueous solution will be of a value typical in the context of fertilizer solutions, i.e. a pH of 5-6.

It is preferred to apply the fertilizer to the growth substrate as the sole nitrogen source for optimum use of the inventive fertilizer. However, advantages are afforded over conventional techniques even when the fertilizer is in mixture with other nitrogen-containing fertilizers, such as an ammonium compound and possibly a nitrate compound. For example, such a mixture of nitrogen-containing fertilizers may consist of 30-80% by weight fertilizer according to the invention, 20-70% by weight ammonium compound, and 0-40% by weight nitrate compound. Cultivating trials, which will be discussed further on in this document, with, inter alia, a fertilizer having a nitrogen source of 34% of the fertilizer according to the invention, 33% ammonium and 33% nitrate have been carried out and have shown that such a mixture of nitrogen-containing chemicals give good development and growth to conifer plants.

As mentioned previously, complete nutrient solutions (normally without the macro nutrient calcium) are commercially available, and the recipes of such nutrient solutions will be exemplified further on in the document. It is highly appropriate to remove the nitrogen source, or as is more usual the nitrogen sources, included in present day nutrient solutions and replace this nitrogen source or these nitrogen sources with the inventive fertilizer.

Growth substrates, such as peat and humus for instance, contain a large number of compounds or groups that are negatively charged. This is thought to be the main reason why the inventive fertilizer, i.e. the basic protein amino acids and their salts, which contain two positively charged groups per molecule, are quickly adsorbed by the growth substrate and will not accompany the water or the aqueous solution as it drains through the clump or growth substrate, or root ball, when raising tree seedlings for instance, and leaves said clump via the holes in the pot containing the growth substrate. Moreover, it appears that the roots of the tree seedling are able to successively search for these nitrogen depots in the clump of growth substrate in keeping with the requirement for development and growth of the plant. The above described hypothesis also explains why the ammonium ion, which has one positive charge, is adsorbed effectively in the clump of growth substrate. This would also seem to explain why the nitrate ion, which is negatively charged, is not adsorbed to any great extent by the clump of growth substrate, but accompanies the water or the aqueous solution as it leaves the clump and falls to the ground and a large part of which finally reaches the ground water.

Of the aforementioned basic protein amino acids and their salts, arginine and it salts are preferred as the nitrogen source in the growth substrate for plant growth. There are several reasons why this is so. One reason is that arginine is cheaper to buy than lysine and histidine. Another reason is because each arginine molecule contains four nitrogen atoms, whereas histidine contains three nitrogen atoms and lysine two nitrogen atoms, meaning that a comparatively very low amount of arginine need be applied in order to obtain a given quantity of nitrogen in the growth substrate. A third reason is because the toxicity limit of arginine would appear to lie far above the toxicity limit of the two remaining basic amino acids.

This latter circumstance means that arginine can be added to an aqueous solution from an extremely low quantity, so as to obtain a concentration of one millimole per liter for instance, to a very large quantity, so as to obtain a concentration of 30 millimole per liter for example. A high arginine concentration in an aqueous solution enables charging the clump of growth substrate surrounding, e.g. the roots of the tree seedling, with a very large quantity of nitrogen just prior to the plant leaving the nursery and moving the plant to the place where it is to be planted. This enables the growth substrate to be charged with nitrogen in a quantity such as to guarantee the nitrogen requirement of the plant over a long period of time at the ultimate growing site of the plant. From a survival aspect, it is beneficial that the plant is already large and strong when planted outdoors, and that the plant will continue to grow quickly when planted.

Advantages

The cultivation trials described further on in this specification show that the inventive fertilizer, both as a sole nitrogen source and in mixture with other nitrogen sources, imparts development and growth to tree seedlings that is comparable with the nitrogen sources that have long been used in the past and that are used also at present.

The major advantage afforded by the inventive fertilizer is that it remains essentially stationary and immobile once having been added to the clump of growth substrate, and disappears from the clump essentially solely in the manner intended, namely by the roots of the plant taking-up the fertilizer and its nitrogen content. As opposed to what was earlier the case, i.e. that the major part of the nitrogen-containing chemical applied to the growth substrate leaked out into the ground and the major part of this leakage ultimately reached the ground water, the amount of the nitrogen-containing chemical according to the invention that leaks onto the ground is extremely small, and that this very small quantity will probably never ultimately reach the ground water, since the chemical will certainly be bound in some layer of soil on its path down through the ground. All of this is highly beneficial from an environmental aspect.

This also means that excessively large amounts of nutrient mixture or fertilizer need not be applied to ensure that the plant will always have access to sufficient nitrogen during its growth. Moreover, each molecule in the inventive fertilizer will contain at least two nitrogen atoms, more specifically two nitrogen atoms in the case of lysine, three nitrogen atoms in the case of histidine and four nitrogen atoms in the case of arginine, as compared with only one nitrogen atom per ion in the case of ammonium $NH_4^+$ and nitrate $NO_3^-$. This means that a comparatively low quantity of the chemical concerned will be applied in a nutrient mixture. This applies particularly to arginine that has four nitrogen atoms.

The preferred inventive fertilizer, i.e. the L-form of arginine and its salts, with its high nitrogen concentration per molecule, its high affinity to growth substrates, and its high toxicity limit, can be exploited with particular benefit in several ways and is thus a practically unique nitrogen source for plants.

An example of the special utility of the invention resides in the aforesaid possibility of charging a plant and its root ball or clump of growth substrate with a maximum nitrogen content just before and/or in conjunction with planting the plant on an outdoor site.

DESCRIPTION OF THE DRAWINGS

FIG. 1 illustrates the results obtained in cultivation trials with pine plants in peat using various nitrogen sources, and FIG. 2 shows the results obtained in cultivation trials with spruce plants in peat using various nitrogen sources.

BEST EMBODIMENT

The cultivation trials carried out with both the inventive fertilizer and with other chemicals as a nitrogen source in raising tree seedlings will now be described in a detailed way and by way of example, together with a presentation of data relating to the mobility of different chemicals in growth substrates.

Example 1

The cultivation trials presented below were carried out over a time period of 59 days in a greenhouse that was kept at a constant temperature of 20° C. Lighting was kept at 150 micromole light per square meter ($m^2$) and second (s). The lamps used to this end were Philips Powertone SON-T+400 Watt.

720 pine seeds were sown in pots that contained 0.5 liter unfertilized (but weakly limed) Sphangnum peat, with five seeds per pot. The pots were plastic pots that included typically four small holes in the bottom of the pot. The peat had a pH of 5.5 and its humification was H2-H4. Fertilizer was administered on Monday and Tuesday of each week and the seeds, and later the seedlings or shoots, were watered each Sunday. The nutrient mixture and the water were both brought a pH of 5.0 with hydrochloric acid. Both the nutrient mixture and the water were administered manually to each pot with the aid of so-called bird pipette having a capacity of one deciliter. Thus, precisely 100 millimeters of fertilizer and water respectively was supplied to the peat in the pots on each administering occasion.

Eight different nutrient mixtures were tested and the nitrogen for each nutrient mixture was charged in three different concentrations, namely concentrations of one millimole per liter (1 mM), three millimole per liter (3 mM) and ten millimole per liter (10 mM). Six pots, and therewith thirty plants, were used for each nutrient mixture and each concentration, giving a total of 144 pots.

The conventional and commercially well known nutrient mixture superba™, s obtainable from the company Hydro Agri was used as a comparison in respect of the remaining seven nutrient mixtures.

This conventional nutrient mixture is sold as a relatively concentrated aqueous solution and has the following nutrient content.

TABLE 1

| Plant nutrient | Percent by weight | Gram/liter |
| --- | --- | --- |
| Total nitrogen (N) | 6.5 | 78 |
| Whereof nitrate | 4.0 (61.5%) | 48 |
| Whereof ammonium | 2.5 (38.5%) | 30 |
| Phosphorus (P) | 1.0 | 12 |
| Potassium (K) | 4.7 | 56 |
| Magnesium (Mg) | 0.6 | 7 |
| Sulphur (S) | 0.5 | 6 |
| Boron (B) | 0.01 | 0.12 |
| Copper (Cu) | 0.003 | 0.04 |
| Iron (Fe) | 0.07 | 0.84 |
| Manganese (Mn) | 0.04 | 0.48 |
| Molybdenum (Mo) | 0.001 | 0.01 |
| Zinc (Zn) | 0.01 | 0.12 |

Of the above listed micro nutrients, copper, iron, manganese and zinc are chelated with the complex former EDTA (ethlylendiaminetetraacetic acid).

The before described commercial product was diluted about 100 times with pure water, so as to obtain a solution with a concentration of ten millimoles per liter with respect to nitrogen. Further dilution was required to obtain respective concentrations of three millimole and one millimole.

The remaining seven nutrient mixtures were obtained, by preparing a stock solution that coincides totally with the before described commercial product but with the exception that the nitrogen source in the form of 61.5% nitrogen in nitrate form and 38.5% nitrogen in ammonium form was excluded.

Instead, this nitrogen-free stock solution was given five different nitrogen sources in corresponding amounts, namely two in accordance with the invention—consisting of arginine alone and arginine (34%) in mixture with ammonium (33%) and nitrate (33%)—and three other nitrogen sources, namely the protein amino acid glycine (note that this does not concern a basic protein amino acid) and ammonium $NH_4^+$, and ammonium in mixture with nitrate $NO_3^-$ at a ratio of 95/5. Each nutrient mixture based on the latter two nitrogen sources were prepared and have been given the designation + (plus) in the following. The addition is that the stock solution has been charged with twice the conventional amount of both potassium and magnesium. As those skilled in this art will realise, this has been done because a significant increase in the amount of ammonium nitrogen at the cost of the amount of nitrate nitrogen may result in a potassium and magnesium deficiency from the nutrient aspect.

It will be noted that with regard to the inventive fertilizer, i.e. the basic protein amino acid arginine that contains four nitrogen atoms, the concentration has been calculated on the basis of one nitrogen atom, which means that the actual addition of the acid calculated in grams per liter is comparatively low or very low.

At the end of the cultivation trials, the thirty pine plans in each trial series were taken up and their dry weight determined in grams.

FIG. 1 shows the results achieved with regard to the mean growth of the pine plants. The sign I stand for the standard error defined as the standard deviation (which is a well defined term to describe the spread between tests) divided by the square root of the number of samples, in this case thirty samples.

The best growth in respect of pine plants was obtained with the conventional nutrient mixture superba™ s and the two nutrient mixtures that included the inventive fertilizer, i.e. arginine as the sole nitrogen source or in mixture with ammonium and nitrate. It is worth noting that the growth of the pine plants increased constantly with an increase in the nitrogen addition.

With regard to growth, these three preparations are followed by the nutrient mixture that includes glycine as the nitrogen source. In the case of this preparation, an increase in the nitrogen charge from three millimoles to ten millimoles resulted in a slight decrease in growth or at least not an increased growth. The use of solely ammonium as a nitrogen source gave sufficiently good growth at a charge of three millimoles per liter, whereas a charge increase to ten millimoles per liter resulted in catastrophic reduction in growth. Addition of two times the amount of potassium and magnesium to the nutrient mixture containing this nitrogen source resulted in some improvement in the growth of the pine plants. The nutrient mixture that contained ammonium and nitrate as the nitrogen source in a ratio of 95 to 5 gave the lowest growth of the pine plants at an addition of three millimoles per liter. An addition of twice the amount of potassium and magnesium to the nutrient mixture containing this nitrogen source also resulted in some improvement in the growth of the pine plants.

Example 2

720 spruce seeds were sown in peat at the same time as and in parallel with the above described trials. The trials carried out on spruce seeds and on spruce plants stemming from the seed were identical to the earlier described trials.

FIG. 2 shows the results achieved in respect of the growth of the spruce plants, in the form of a mean value. The standard deviation is also shown in this case.

Essentially the same ranking of the nitrogen sources was attained in these trials as those attained in example 1, but with the exception that the conventional nutrient mixture superba™ s resulted in slightly better growth of the spruce plants than the growth achieved with the two nutrient mixtures that contained the substance preferred in accordance with the invention, i.e. the arginine. It will be noted, however, that arginine as a sole nitrogen source (third from the left in FIG. 2) resulted in constantly increased growth of the spruce plants with increased nitrogen charges, as opposed to that experienced from all other nitrogen sources.

FIG. 2 lacks stacks for the mean weight of those spruce plants that have received a nitrogen charge of ten millimoles per liter of the four nutrient mixtures in the right half of FIG. 2, i.e. where the nitrogen source is ammonium alone or ammonium in mixture with nitrate at a ratio of 95 to 5. This is because these spruce plants were dead at the end of the trial. In other words, the toxicity limits of these nitrogen sources had been reached and probably exceeded.

Example 3

In order to investigate the mobility of different nitrogen containing chemicals or nitrogen sources in growth substrates the following trials were carried out.

Three nitrogen containing chemicals were tested, namely the basic protein amino acid L-arginine, i.e. the inventive fertilizer, the protein amino acid glycine and the salt ammonium chloride.

A given amount of peat of the same kind as that used in the cultivation trials and whose properties have been given above was dried in an oven at a temperature of 60° C. for 20 hours. This resulted in bone dry peat. Portions of this peat corresponding to 0.25 grams were inserted into nine test tubes. 5 ml water was delivered to each test tube, this water having been purified in filters from the company Millipore. The test tubes and their contents were then allowed to stand at room temperature for 20 hours, so that the peat would become wet through.

The aforesaid three chemicals, each in solid state, were weighed into three equal portions. Each portion was dissolved in 5 ml water that had been purified in the before described manner. The amount or weight of the substance was such as to obtain a substance concentration of 5 millimolar. Thus, the amount of nitrogen was four times greater than the other two substances in the case of arginine.

Each of the nine chemical solutions was delivered to a respective test tube that contained water-drenched peat. The amount of chemical added was 0.2 millimole per gram peat in all cases. Subsequent to supplying said liquid, each test tube was shaken by hand and thereafter allowed to stand at room temperature for one hour. The materials in the test tubes layered, such that the lowermost third contained a substantially clear liquid phase and the remainder of the tube contained liquid-drenched peat. A pipette was inserted into the test tube down to approximately midway of the liquid phase. About 1.5 milliliters of liquid was drawn off through the pipette and analysed with respect to its chemical content with the aid of HPLC-chromatography (HPLC=High Performance Liquid Chromatography).

The measuring method used has been published in the article "Quantitative analysis of amino acids in conifer tissues by high-performance chromatography and fluorescence detection of their 9-fluorenylmethylchloroformate derivatives" by the authors T. Näsholm, G. Sandberg and A. Ericsson on pages 225-236 in the Journal of Chromatography 396, (1987).

As evident from the foregoing, three similar tests were carried out for each chemical. The obtained results in the form of the mean values of the adsorption or retention of the chemicals in the peat will be apparent from the table below.

TABLE 2

| Chemical | Retention % | Standard deviation % | Standard error % |
|---|---|---|---|
| Arginine | 89.1 | 0.5 | 0.3 |
| Glycine | −1.9 | 1.8 | 1.0 |
| Ammonium ($NH_4^+$) | 28.0 | 10.5 | 6.1 |

It will be seen that in these tests almost 90% of the arginine added has fastened to or stayed in the substrate, peat, whereas only 28% of the ammonium added has remained in the peat, and a little more than 70% has remained in the water phase. It may initially appear to be unreasonable that the amount of glycine retained is less than zero, i.e. the amount in the liquid phase is greater than that supplied, although this can be explained by the fact that peat contains naturally a certain amount of glycine and that what has happened is that the glycine supplied has landed in the water phase and, moreover, at least a part of the natural glycine has been leached from the peat by the liquid supplied and has ultimately reached the water phase. The fact that almost 11% of the arginine supplied and all of slightly more than 70% of the ammonium supplied is found in the liquid phase despite everything can be explained in part by the test set-up, including shaking of the test tubes and their contents after the second liquid supply. Moreover, the test tubes contained no plants with their root systems encased in peat, which might also explain the surprisingly high mobility of the ammonium ion. If a plant had been present in the test tube, it is thought that the immobility of the arginine would have approached 100%.

These tests prove convincingly the superiority of the preferred inventive fertilizer, i.e. the L-arginine and its salts, with respect to immobility in growth substrates and also in comparison with the ammonium ion, which has earlier been understood to be relatively immobile by the experts in these fields. This is highly significant from an environmental aspect, for natural reasons and for those reasons earlier explained. That the fertilizer concerned also gives an excellent effect with respect to the growth of tree seedlings for instance, shows that the nitrogen containing fertilizer according to the invention is practically unique in the present context.

The invention claimed is:

1. A method for making a nitrogen-enriched growth substrate for plants, the method comprising adding nitrogen in the L-form of a basic amino acid to the growth substrate, wherein the nitrogen is immobilized in the substrate for improved uptake by the plant and leakage of nitrogen into the ground is avoided.

2. The method according to claim 1, wherein the nitrogen in the L-form of a basic amino acid is added as an aqueous solution.

3. The method according to claim 1, wherein the nitrogen in the L-form of a basic amino acid is added in a solid form or as a powder.

4. The method according to claim 2, wherein the nitrogen in the L-form of a basic amino acid solution is L-arginine at a concentration between 1 mM and 30 mM.

5. The method according to claim 1, where the L-form of a basic amino acid is one or more selected from the group consisting of L-arginine, L-histidine, and L-lysine.

6. The method of claim 2, further including the step of drying the growth substrate, after adding the nitrogen in the L-form of a basic amino acid is added.

7. The method of claim 1, wherein the nitrogen in the L-form of a basic amino acid is the sole form of nitrogen added to the growth substrate.

* * * * *